R. SIMON, J. A. GAUTHIER AND F. J. HAUSER.
BUSHING REMOVER.
APPLICATION FILED MAR. 9, 1918.
1,304,109.
Patented May 20, 1919.
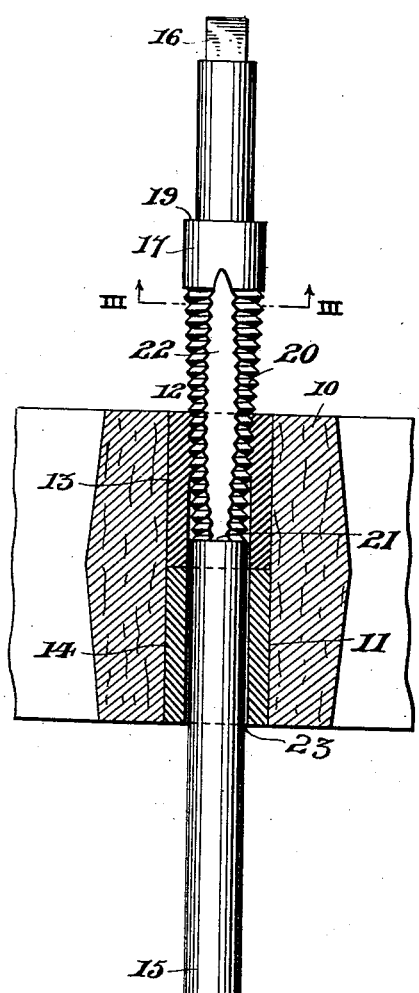
FIG. 1.
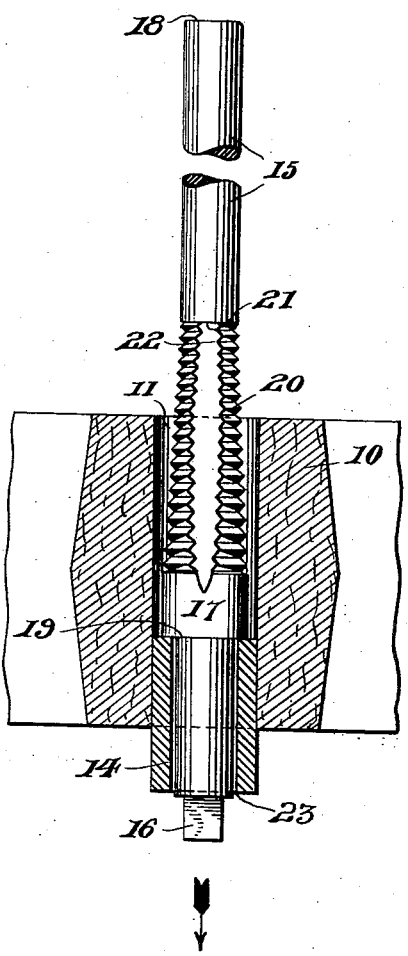
FIG. 2.
FIG. 3.

UNITED STATES PATENT OFFICE.

RICHARD SIMON, JOSEPH A. GAUTHIER, AND FRANK J. HAUSER, OF NORWAY, MICHIGAN.

BUSHING-REMOVER.

1,304,109. Specification of Letters Patent. Patented May 20, 1919.

Application filed March 9, 1918. Serial No. 221,443.

*To all whom it may concern:*

Be it known that we, RICHARD SIMON, JOSEPH A. GAUTHIER, and FRANK J. HAUSER, citizens of the United States of America, residing at Norway, in the county of Dickinson and State of Michigan, have invented certain new and useful Improvements in Bushing-Removers, of which the following is a specification.

This invention relates to certain new and useful improvements in bushing removers.

The primary object of the invention is the provision of a simple and strong implement or tool adapted for the ready removal of bushings or sleeves such as the bushings found in the wheel hub of a Ford automobile, the device being formed in a single piece and being calculated to wear indefinitely.

A further object of the invention is the provision of a simple and inexpensive device adapted for removing the spindle bushings of Ford wheels, the arrangement being such that a two-part as well as a one-part bushing may be readily and quickly removed by means of this device together with the aid of an ordinary wrench.

With these general objects in view and others that will become apparent as the nature of the invention is better understood, the same consists in the novel construction, combination and arrangement of parts hereinafter more fully described, illustrated in the accompanying drawing, and then claimed.

In the drawing forming a part of this application and in which like designating characters refer to corresponding parts throughout the several views, Figure 1 is a sectional view through a portion of a wheel hub and the two-part bushing thereof illustrating our device in its manner of employment in removing the bushing from the hub.

Fig. 2 is a similar view showing the device partially broken away in the act of removing the last of two sections of a bushing, and Fig. 3 is a transverse sectional view taken upon line III—III of Fig. 1.

Referring more in detail to the drawing, it will be understood that the device is adapted for removing any form of bushing from the hub of a wheel and is herein illustrated in connection with a hub 10 having a bore 11 of uniform diameter extending therethrough provided with a spindle bushing 12 formed in two sections 13 and 14. The manner of removing the two sections of the bushing 12 from the bore 11 by means of our device will be described and the operation of removing a single piece bushing will then be readily apparent without further description.

Our implement or tool is a one-piece device consisting of a cylindrical shaft 15 having a squared reduced end 16 at one end thereof, serviceable as a wrench hold portion. An enlargement 17 is provided intermediate the opposite ends of the shaft 15 and preferably nearer the end thereof provided with a head 16 than the other end 18 thereof, the said enlargement providing an annular shoulder 19 at the side of the enlargement adjacent the headed end of the shaft.

A tapered threaded portion or tap 20 is arranged extending from the enlargement 17 toward the shaft end 18 and terminating at the line 21, unthreaded groove portions 22 being arranged longitudinally of the threaded portion 20.

The enlargement 17 being of greater diameter than the opening 23 through the bushing 12, the tool is dropped into the bushing with a portion of the shaft 15 freely extending therethrough and the threaded portion 20 engaging the section 13 of the bushing, from which side the device is being inserted. The shaft 15 is readily turned by applying a wrench to the head 16 for engaging the threaded portion 20 with the bushing section 13. By pounding upon the shaft end 18, the bushing section 13 will be readily removed by reason of the said section 13 being secured to the threaded portion of the device.

The section 13 is then removed from the tool and the tool reversed for thrusting the shaft 15 into the bore 11 and seating the shoulder 19 upon the inner end of the other bushing section 14 and whereupon this section is readily driven out of the bore by pounding upon the shaft end 18. The direction of movement of the tool in removing the bushing section 13 is indicated by the arrow in Fig. 1 of the drawing while a similar showing by means of an arrow is shown in Fig. 2 when the bushing 14 is being removed.

It will be understood that where a single bushing is employed, the same may be driven entirely through the bore 11 in the manner indicated by the bushing section 14 in Fig.

2 of the drawing, while on the other hand, a one-piece bushing could be engaged with the threaded portion 20 of the tool and driven outwardly of the bore 11 in the manner illustrated in connection with the bushing section 13 in Fig. 1 if the same was desired. It will be understood that the manner of separately removing the two portions of a sectional bushing in the manner herein described is preferable to driving both sections of a two-part bushing entirely through the hub of a wheel, such operation being impractical.

A serviceable one-piece tool is arranged which possesses great strength and durability and by means of which either one or two-part spindle bushings may be readily removed from a wheel hub without mutilating any portion of the hub.

What we claim as new is:—

1. A bushing remover comprising a cylindrical shaft having a reduced square at one end thereof, an enlargement upon the shaft spaced from its headed end providing an annular shoulder and a tapered threaded portion on the shaft extending from said enlargement toward the unheaded end of the shaft.

2. A remover for spindle bushings comprising a shaft adapted for free positioning within the bushing, a tapered threaded portion upon the shaft adapted for biting engagement with the outer portion of a bushing section when the shaft is arranged through the bushing and an enlargement adjacent said threaded portion forming an annular shoulder adapted for seating upon the inner end of a remaining bushing section upon a reverse positioning of the shaft through said section subsequent to the removal of the other bushing section from the hub.

3. A single piece bushing remover comprising a cylindrical shaft, an enlargement upon said shaft, and a tapered threaded portion for the shaft extending from said enlargement toward one end of the shaft.

4. A single piece bushing remover comprising a cylindrical shaft, an enlargement upon said shaft, a tapered threaded portion for the shaft extending from said enlargement toward one end of the shaft, a reduced squared head upon the other end of the shaft adapted for receiving a wrench, the said enlargement having an annular shoulder at its end opposite the said threaded portion adapted for engaging the end of a bushing member during the removing operation.

In testimony whereof we affix our signatures.

RICHARD SIMON.
JOSEPH A. GAUTHIER.
FRANK J. HAUSER.